(12) United States Patent
Tian

(10) Patent No.: US 8,015,319 B2
(45) Date of Patent: Sep. 6, 2011

(54) METHOD, SYSTEM, CLIENT AND SERVER FOR IMPLEMENTING DATA SYNC

(75) Inventor: Linyi Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 157 days.

(21) Appl. No.: 11/848,111

(22) Filed: Aug. 30, 2007

(65) Prior Publication Data

US 2008/0104277 A1 May 1, 2008

Related U.S. Application Data

(63) Continuation of application No. PCT/CN2006/002887, filed on Oct. 27, 2006.

(30) Foreign Application Priority Data

Oct. 27, 2005 (CN) .......................... 2005 1 0116802
Aug. 14, 2006 (CN) .......................... 2006 1 0109591

(51) Int. Cl.
*G06F 15/16* (2006.01)

(52) U.S. Cl. ......................... 709/248; 707/200; 707/204

(58) Field of Classification Search .......... 709/201–203, 709/219, 246, 248; 707/200, 203–204
See application file for complete search history.

(56) References Cited

U.S. PATENT DOCUMENTS

| | | | | |
|---|---|---|---|---|
| 5,778,389 A | * | 7/1998 | Pruett et al. .................... | 707/204 |
| 5,806,073 A | * | 9/1998 | Piaton ........................... | 707/200 |
| 6,000,000 A | * | 12/1999 | Hawkins et al. .............. | 707/610 |
| 6,131,096 A | * | 10/2000 | Ng et al. ............................... | 1/1 |
| 6,247,135 B1 | * | 6/2001 | Feague .......................... | 713/400 |
| 6,477,543 B1 | * | 11/2002 | Huang et al. .................. | 707/200 |
| 6,721,871 B2 | * | 4/2004 | Piispanen et al. ................. | 712/1 |
| 6,810,405 B1 | * | 10/2004 | LaRue et al. .................. | 707/201 |
| 6,839,564 B2 | * | 1/2005 | Sutinen et al. ................ | 455/502 |
| 6,976,030 B2 | * | 12/2005 | Lee et al. .................. | 707/103 R |
| 7,024,430 B1 | * | 4/2006 | Ingraham et al. ............. | 707/201 |

(Continued)

FOREIGN PATENT DOCUMENTS

CN 1232585 A 10/1999

(Continued)

OTHER PUBLICATIONS

SyncML Initiative, "SyncML Sync Protocol, version 1.1", Feb. 15, 2002, retrieved from <http://www.openmobilealliance.org/tech/affiliates/syncml/syncml_sync_protocol_v11_20020215.pdf>.*

(Continued)

*Primary Examiner* — Asad M Nawaz
*Assistant Examiner* — Sarah Drabik
(74) *Attorney, Agent, or Firm* — Leydig, Voit & Mayer, Ltd.

(57) ABSTRACT

This invention discloses a method for synchronizing a plurality of devices, including: obtaining, by a first device, an extended address of an informational node of a plurality of informational nodes of a second device, the plurality of informational nodes arranged in a hierarchical tree structure; and utilizing the extended address to locate the informational node amongst the tree structure to enable synchronization of the informational node; wherein the extended address includes a hierarchical location of the informational node. This invention further discloses a system, client and server for data sync, and the folder-level data sync can be implemented by using the method of this invention.

10 Claims, 8 Drawing Sheets

U.S. PATENT DOCUMENTS

| | | | | |
|---|---|---|---|---|
| 7,149,813 | B2* | 12/2006 | Flanagin et al. | 709/248 |
| 7,320,011 | B2* | 1/2008 | Koskimies | 707/201 |
| 7,386,588 | B2* | 6/2008 | Mousseau et al. | 709/205 |
| 7,395,281 | B2* | 7/2008 | Edwards | 707/203 |
| 2002/0099727 | A1* | 7/2002 | Kadyk et al. | 707/201 |
| 2003/0028554 | A1* | 2/2003 | Koskimies et al. | 707/201 |
| 2003/0191827 | A1 | 10/2003 | Piispanen et al. | |
| 2003/0204640 | A1* | 10/2003 | Sahinoja et al. | 709/311 |
| 2004/0215669 | A1* | 10/2004 | Mettala et al. | 707/201 |
| 2004/0225731 | A1 | 11/2004 | Piispanen et al. | |
| 2007/0016676 | A1* | 1/2007 | Breuer et al. | 709/225 |

FOREIGN PATENT DOCUMENTS

| | | |
|---|---|---|
| CN | 1392704 A | 1/2003 |
| CN | 1625865 A | 6/2005 |
| JP | 2005-521946 A | 11/2004 |
| WO | WO 98/15078 A1 | 4/1998 |
| WO | WO 03/083684 A1 | 10/2003 |

OTHER PUBLICATIONS

"SyncML Representation Protocol, version 1.0," 1-104 (Dec. 7, 2000) http://www.syncml.org/docs/syncml_represent_v10_20001207.pdf.

"SyncML Sync Protocol, version 1.1," 1-62 (Feb. 15, 2002) http://www.syncml.org/docs/syncml_sync_protocol_v11_20020215.pdf.

$3^{rd}$ Office Action in corresponding Chinese Application No. 200610109591.1 (Nov. 15, 2010).

Rejection Decision in corresponding Chinese Application No. 200610109591.1 (Mar. 24, 2011).

Rejection Decision in corresponding Japanese Application No. 2008-536915 (Jan. 2, 2011).

$1^{st}$ Office Action in corresponding Chinese Application No. 200610109591.1 (Dec. 18, 2009).

$2^{nd}$ Office Action in corresponding Chinese Application No. 200610109591.1 (Jul. 30, 2010).

$1^{st}$ Office Action in corresponding Chinese Application No. 2006800119601 (Feb. 12, 2010).

Written Opinion of the International Searching Authority in PCT Application No. PCT/CN2006/002887 (Feb. 8, 2007).

"SyncML Representation Protocol," Jun. 15, 2001, Version 1.0.1, Open Mobile Alliance, San Diego, California.

"OMA-SyncML-RepPro-V1_2-20050114-D—SyncML Representation Protocol—Draft," Jan. 14, 2005, Draft Version 1.2, Open Mobile Alliance, San Diego, California.

"OMA-SyncML-DataSyncRep-V1_2-20050316-C—SyncML Representation Protocol, Data Synchronization Usage," Mar. 16, 2005, Candidate Version 1.2, Open Mobile Alliance, San Diego, California.

"OMA-SyncML-DataSyncProtocol-V1—2-200400601-C—SyncML Data Sync Protocol," Jun. 1, 2004, Candidate Version 1.2, Open Mobile Alliance, San Diego, California.

* cited by examiner client

Client Database

| LUID | Data |
|------|------|
| 11 | Car |
| 22 | Bike |
| 33 | Truck |
| 44 | Shoes | server

Server Database

| GUID | Data |
|------|------|
| 1010101 | Car |
| 2121212 | Bike |
| 3232323 | Truck |
| 4343434 | Shoes |

Server Mapping Table

| GUID | LUID |
|------|------|
| 1010101 | 11 |
| 2121212 | 22 |
| 3232323 | 33 |
| 4343434 | 44 |

| Data Item Table | |
|---|---|
| Item LUID | Data |
| ......... | ......... |
| 2001 | N1 |
| 2002 | N2 |
| 2003 | N3 |

| Folder Table | | | |
|---|---|---|---|
| Folder LUID | Name | Parent Source | status |
| ......... | ......... | ......... | ...... |
| 1007 | Sprint Festival | 1006 | N |
| 1008 | Mid-autumn Festival | 1006 | N |
| 1006 | bless | / | N |
| 1005 | joke | / | E |

| Index Table | | |
|---|---|---|
| Item LUID | Parent Source | status |
| ......... | ......... | ......... |
| 2001 | 1006 | N |
| 2002 | 1007 | N |
| 2003 | 1008 | N |

| Data Item Table: | |
|---|---|
| Item LUID | Data |
| ... ... ... | ... ... ... |
| 2001 | U1 |
| 2002 | U2 |

| Folder Table: | | | |
|---|---|---|---|
| Folder LUID | Name | Parent Source | status |
| ... ... ... | ... ... ... | ... ... | ... ... ... |
| 1007 | Sprint Festival | 1006 | E |
| 1008 | Mid-autumn Festival | 1006 | E |
| 1006 | bless | / | U |
| 1005 | joke | / | E |

| Index Table: | | |
|---|---|---|
| Item LUID | Parent Source | status |
| ... ... ... | ... ... | ... ... ... |
| 2001 | 1006 | U |
| 2002 | 1007 | U |
| 2002 | 1008 | U |

METHOD, SYSTEM, CLIENT AND SERVER FOR IMPLEMENTING DATA SYNC

This application is a continuation of International Patent Application No. PCT/CN2006/002887, filed Oct. 27, 2006, which claims priority to Chinese Patent Application No. 200510116802.X, filed Oct. 27, 2005, and Chinese Patent Application No. 200610109591.1, filed Aug. 14, 2006, all of which are hereby incorporated by reference

FIELD OF THE INVENTION

The present invention relates to the field of the data sync specifications of Synchronization Makeup Language (SyncML) defined by the Open Mobile Alliance (OMA), and in particular, to a method, system, client and server for implementing data sync based on the SyncML protocol.

BACKGROUND OF THE INVENTION

To formulate the standard specifications for the data sync of personal information and enterprise data among a plurality of platforms and networks, the OMA proposes SyncML data sync specifications. The objective of SyncML development is to implement the collaborative work among terminal users, device developers, basic component developers, data providers, so as to make it possible to access data of any network anywhere at any moment by using any terminal device. The typical scenario is the data sync between a mobile device/an application server and a network server. In addition, the SyncML can also be used in the peer-to-peer data sync, such as the data sync between two personal computers (PC).

FIG. 1 is a schematic diagram illustrating the data sync based on the SyncML specifications. After having negotiated parameters in a data sync initialization phase, a client and server send the data that has changed to each other to guarantee the data is synchronized between the two parties.

A Data Synchronization Client (DS Client) generally refers to an intelligent terminal, such as PC software, mobile phone or Personal Digital Assistant (PDA) etc. A Client Database is configured in the device to store the user data, including: an address book, calendar, note, short message, e-mail, etc. The formats of all these data are defined in standard specifications, and the DS Client is able to convert the data into a standard format and send the converted data to a DS Server which processes the data and stores them in its database.

The DS Server may receive a sync message containing sync commands from the DS Client and send a sync message back to the DS Client. The DS Server may be a network server or a PC. A Server Database is configured in the DS Server to store the data of the DS Server.

Data identifiers are stored in both the DS Client and the DS Server. The DS Client uses a Local Unique Identifier (LUID) as the data identifier while the DS Server uses a Global Unique Identifier (GUID) as the data identifier.

FIG. 2 is a schematic diagram illustrating the data storage of a DS Client and a DS Server. As shown in FIG. 2, only the correspondence relationship between various LUIDs and data needs to be maintained in the DS Client, but in the DS Server, not only the correspondence relationship between various GUIDs and data but also the correspondence relationship between various GUIDs and LUIDs needs to be maintained. There are multiple data sync types, as shown in Table 1.

TABLE 1

| Sync type | Description information |
| --- | --- |
| Two-way sync | A normal sync type in which the client and the server exchange information about modified data in these devices. The client sends the modifications first. |
| Slow sync | A form of two-way sync in which all items are compared with each other on a field-by-field basis. In practice, this means that the client sends all its data from a database to the server and the server does the sync analysis (field-by-field) for this data and the data in the server. |
| One-way sync from client only | A sync type in which the client sends its modifications to the server but the server does not send its modifications back to the client. |
| Refresh sync from client only | A sync type in which the client sends all its data from a database to the server (i.e., exports). The server is expected to replace all data in the target database with the data sent by the client. |
| One-way sync from server only | A sync type in which the client gets all modifications from the server but the client does not send its modifications to the server. |
| Refresh sync from server only | A sync type in which the server sends all its data from a database to the client. The client is expected to replace all data in the target database with the data sent by the server. |
| Server Alerted Sync | A sync alert type, which provides the means for a server to alert the client to perform synchronization. When the server alerts the client, it also tells the client which type of synchronization to initiate. |

In addition, the data sync procedure defined in the SyncML specifications usually includes three phases:

1. A sync initialization phase, in which, it is mainly to implement authentication, negotiation of the sync database to be synchronized, negotiation of sync capabilities (including: which data formats and sync types are supported by client and/or server, etc.), and such negotiation procedures may have to be conducted for several times.

2. A sync phase, mainly including: one side of the DS Client and DS Server sending the data that have changed to the other side of the two via an operation command according to the data status modification; and the other side performing the operation command (e.g., an operation command of update, delete, or add), with the data that have changed to update its own data so as to achieve the purpose of the data sync.

3. A sync accomplishment phase, which mainly includes: the DS Client and the DS Server confirming the accomplishment of the sync to each other.

In the prior art, the storage mode of Folder and File has been defined for the data, which simulates the tree structure based on the folders and files in the PC. For the data with hierarchy relationship logically or physically, the data can be presented as a tree structure consisting of at least one node, each node of which may be a folder node (also referred to as a folder item) or an item node (also referred to as a data item). But, it is not possible to sync a specific node with its content or a sub-tree as required in the prior art. Besides, the method for synchronizing the address book by groups is implemented by using the filter technique based on the Group field within the vCard, the defect of which is that the sync protocol is tightly coupled with specific data formats, which is not general for all data formats, so a specific node with its content or a sub-tree in the tree structure may not be synchronized as required.

However, at present, there are a lot of data needed to be synchronized which are stored as a fact of the tree structure with hierarchy relationship logically or physically. For example, some data are organized by folders in a tree structure view which logically or physically exists in a user's mobile phone, such as an address book, categorized short messages and e-mails organized by mailboxes, etc. In addition, a calendar or email with attachments could be considered as organized in a hierarchy manner as well. In accordance with the prior art, the user can only sync the whole database rather than a part of the database. Taking short messages as an example, the user can only sync the whole database of the short message but can not sync only one category of the short message named "bless" and leave another category named "joke" not synchronized this time. With regard to the attachment stored outside of the calendar/email, the attachment can not be synchronized and the hierarchy relationship of the attachment and the calendar or email can not be described in the prior art. Meanwhile, it can not be implemented that one data item exists in two categories. For example, Zhang San belongs to the groups of "colleague group" and "friend group" in the address book at the same time.

To sum up, the existing data sync techniques can not satisfy the actual demands, and especially, can not support the notion of one data item in a hierarchy manner or the data sync of any node level in the hierarchy structure.

SUMMARY

Embodiments of the invention disclose a method of synchronizing a plurality of devices, including:

obtaining, by a first device, an extended address of an informational node of a plurality of informational nodes of a second device, the plurality of informational nodes arranged in a hierarchical tree structure; and utilizing the extended address to locate the informational node amongst the tree structure to enable synchronization of the informational node;

wherein the extended address includes a hierarchical location of the informational node.

The embodiments of the invention also disclose a system of synchronizing a plurality of devices, including:

a first device, capable of communicating with a second device, wherein the second device stores in a hierarchical tree structure a plurality of informational nodes;

the first device obtains an extended address of a node of the plurality of nodes of the second device;

the extended address is extended with a hierarchical location of the informational node; and the extended address is capable of being used to locate a specific informational node amongst the tree structure to enable synchronization of the informational node.

The embodiments of the invention disclose another method of synchronizing a plurality of devices, including:

receiving, by a second device, a synchronization command from a first device;

synchronizing, by the second device, an informational node stored in a hierarchical tree structure in the second device, wherein the synchronizing the informational node is performed in response to the synchronization command, the request comprising an extended address representative of a location of the informational node within the hierarchical tree structure.

Therefore, the embodiments of the invention is adopted to flexibly implement the data sync with regard to a certain level, without transmitting the data of the whole database between the client and the server during the data sync, so as to raise data sync efficiency and save system resources as well as fulfill the actual user demands.

DETAILED DESCRIPTION OF EMBODIMENTS

Figures 1, 2:
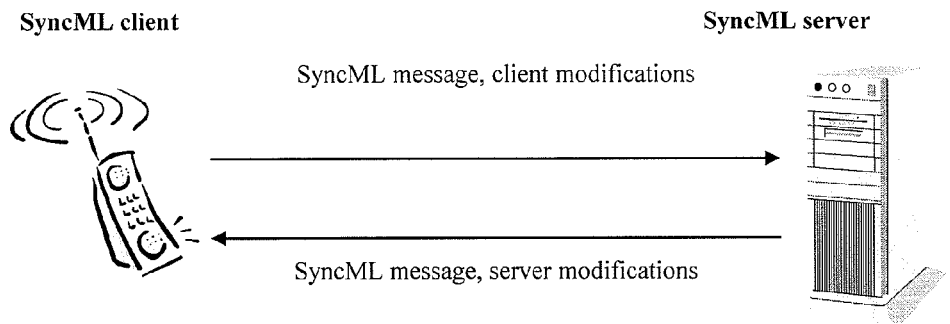
FIG. 1 is a schematic diagram of data sync implementation.
FIG. 2 is a schematic diagram illustrating the data storage of a client and a server.

This invention will hereinafter be described in detail with reference to accompanying drawings and specific embodiments.

The embodiments of this invention disclose a method for implementing data sync, where one side of a client and a server sends a first sync command to the other side. Before the first sync command is sent, the client and the server determine the address of the node to be synchronized. After receiving the first sync command, the recipient side of the first sync command performs data sync of the determined node to be synchronized according to the received first sync command. The node to be synchronized may be any node of a hierarchy tree structure, e.g., a whole database, a logical or physical folder, or a data item.

The data sync can be divided into three phases according to the SyncML protocol, including: a sync initialization phase, a sync phase and a sync accomplishment phase. The process of the sync accomplishment phase in the embodiments of this invention is the same as that in the prior art, so only the sync initialization phase and the sync phase are described hereinafter.

In the sync initialization phase, the address of the node to be synchronized should be designated by the negotiation of the client and the server through sending a second sync command, which may be a database address, a logical or physical folder identity, or a data item identity. One side of the client and the server sends a second sync command that carries the address of the node to be synchronized to the other side which then determines the node currently to be synchronized according to the address of the node to be synchronized carried in the second sync command. The node to be synchronized may include one or more nodes. If the node to be synchronized includes more than one node, one side of the client and the server sends a second sync command for all the nodes to the other side, carrying the addresses of all the nodes, and the other side determines all the nodes included in the current to-be-synchronized node according to the addresses of all the nodes carried in the second sync command. ON one side of the client and the server sends one second sync command for each node to the other side which carries the address of the node, and the other side determines all the nodes included in the nodes currently to be synchronized one by one according to each node address carried in each second sync command. Alternatively, the address of the node to be synchronized may be configured in the client and the server in advance such that there is no need to negotiate the node to be synchronized via the second sync command in the sync initialization phase. The node to be synchronized mentioned in the embodiments of this invention may include the database, folder, data item, or the combination of at least one folder and at least one item. The implementation of the embodiments of this invention is hereinafter described with regard to the node to be synchronized including at least one folder to clarify the principle of the embodiments of this invention while other possible combination of the node to be synchronized will not be specified, however which is still covered by the protection scope of this invention.

Specifically, there are two kinds of modes to realize carrying the address of the node to be synchronized in the second sync command as follows (in case of the node to be synchronized including at least one folder, the address of the node to be synchronized is the address of the folder to be synchronized).

Mode 1: An element for indicating a target database (also referred to as an element for carrying the address of the data to be synchronized) in the existing protocol is extended to be able to indicate the folder (actually it can indicate any node within the tree structure) to be synchronized, which originally as an element for indicating a database-level address is extended as an element capable to indicate a node address of any level. The detailed implementation process may include: pre-defining the format of the Uniform Resource Identifier (URI), i.e., pre-designating the URI of which level identifies a database-level address and the URI of which level identifies a node-level address, and indicating the node to be synchronized by the pre-defined URI. For example, designating the URI of "/files" is the database-level address and the URI of "/files/folder1" is the address of the folder, named folder1, in the database, wherein, "files" is a database name and "folder1" is a folder identity. The Unique Identifier (UID) of a database or a folder or a data item can be used in the URI to more accurately designate the address of the node to be synchronized. For example, "/4980" is designated to be the address of the database to be synchronized, "/4980/4560" is designated to be the address of the subfolder or data item (determined by its data type) with identified by UID 4560 in the No. 4980 database identified by UID 4980. If there are more levels in the database, the URI with a multilevel structure will be adopted, such as, "/4560/4980/556" etc. The URI indication method by using mixture of the number UDI together with the folder name may also be adopted, such as, "/files/4890". Certainly, if there are multiple folders to be synchronized, multiple URIs may be given to indicate these folders. The interior node or leaf node is the data item or logical folder. Moreover, data with external attachments can be represented by one interior node with its sub-node as the leaf node and both of them are data items. Moreover, in a hierarchy structure, one folder node may have at least one sub-node and/or at least one data item node, so an address of the node to be synchronized may consist of a folder identity and a data item identity, e.g., the node address "/Macy/03/05", wherein, "03" is the identity of the data item belonging to the database "Macy", and "05" is the identity of the sub-item (e.g., the attachment) of the parent-node of the data item "03".

Mode 2: An element for indicating a filter condition in the existing protocol is extended to indicate the folder (actually it can indicate any node within the tree structure) to be synchronized. The specific implementation includes, extending the existing filter condition (e.g., Filter command) to indicate the folder to be synchronized. Certainly, if there is more than one folder to be synchronized, these folders can be indicated in the filter condition at the same time.

These two modes for indicating the folder to be synchronized are hereinafter described in detail.

I. Mode 1 is a scheme for negotiating the folder to be synchronized by extending the element for indicating the target database of the existing protocol, wherein the address of the folder to be synchronized carried in the element for indicating the target database is usually referred as a URI.

In the embodiments of this invention, while negotiating the folder to be synchronized by sending a second sync command, a client and a server may further negotiate the sync type negotiation parameter. When the client and the server negotiate the folder to be synchronized by sending the second sync command, the sync type negotiation parameter can be further carried in the second sync command, according to which the current sync type can be determined. The second sync command can be implemented by using an Alert element of the Sync Marker-up Language (SyncML) protocol, where, the element for carrying the address of the folder to be synchronized may be a sub-element of the Alert element (e.g., an Item element), and the element for carrying the sync type negotiation parameter may be a sub-element of the Alert element (e.g., a Data element). The second sync command implemented by using an Alert element can also be called a Sync Alert command. Other sub-elements in the Alert element functioning as the second sync command, such as a Code element etc, can also be used to carry the sync type negotiation parameter and the address of the folder to be synchronized, and an attribute of the Alert element also can be used to carry the sync type negotiation parameter and the address of the folder to be synchronized. The command structures in these cases will not be herein shown one by one, but they should be covered in the protection scope of this invention. And in the future specifications, the name and structure of these elements, sub-elements or attributes may change, but these changes can not be regarded as the limitation for the present invention.

The Alert command may further be extended to implement the multi-folder sync such that it can be used to designate one or more folders to be synchronized. The scheme for implementing the function is given hereinafter.

In the sync initialization phase, supposing that the negotiation of the folder to be synchronized is initiated by a client to a server, the negotiation process is as follows.

The client sends an Alert command that carries the address of the folder(s) to be synchronized to the server, and the address may be the UID or URI of the folder to be synchronized. Then, the server may return a response to the client. An example of the Alert command is given hereinafter. For example, the folder to be synchronized that the client designates is named as folder1. The client sends an Alert command to the server, carrying the sync type and the address of the folder to be synchronized (e.g., UID or URI). If the folder structure of the client is the same as that of the server (if the node to be synchronized only includes at least one folder, the folder structure refers to the data hierarchy structure.), the client directly determines the local address of the folder to be synchronized as the address of the folder to be synchronized in the server according to its local folder structure. If the folder structure of the client is different from that of the server, the client may need to determine the address of the folder to be synchronized in the server, wherein there are several determination methods as follows: 1. The client first acquires the folder structure of the server from the server, and determines the address of the folder to be synchronized in the server according to the acquired folder structure; 2. The server sends the address (e.g., UID or URI) of the folder to be synchronized to the client; 3. The client directly designates the address of the folder to be synchronized, and if the address designated does not exist in the server, the server creates the folder to be synchronized at the address designated by the client; 4. The client determines the address of the folder to be synchronized according to the information input by the user, i.e., the user designates the address of the folder to be synchronized; 5. The client and the server setting the address of the folder to be synchronized in advance. Even if the folder structure of the client is the same with that of the server, the client can also use the above methods to determine the folder to be synchronized. For example, both the client and the server make an agreement that, if a backup sync is to be performed, the folder named "backup" in the server database should be used. The above folder structure may be stored in the server after being created, or it is not stored in the server but created in real time for the designated database by the server if the client requires. If the server sends the Alert command to initiate the sync procedure, the address of the folder to be synchronized may include: the address of the folder to be synchronized in the client (i.e., the source address) and that in the server (i.e., the destination address). The two addresses may be the same or different. With regard to the client as a sync originator, the local address of the folder to be synchronized (i.e., the source address) can be obtained by multiple means, e.g., pre-configuring the source address, or designating the source address by the user, or sending the source address to the client by the server, etc. However, the address of the folder to be synchronized in the server (i.e., the destination address) has to be indicated to the server by the client when initiating the sync procedure. It is the method for indicating the destination address to the server by the client functioning as the sync originator which is herein described while the method for determining the source address by the client will not be discussed here.

It can be implemented via an independent sync session that a client acquires a folder structure of a server, wherein a new sub-element or an attribute should be extended or defined in the Alert command to carry the sync type negotiation parameter, and a new sync type should also be defined only for acquiring the folder structure of the database but not for synchronizing the database. Other sync type may also be defined for acquiring the folder structure of the database and sync data. An implementation scheme for acquiring the folder structure is provided hereinafter.

1. A client sends a command for creating a sync session to a server. Before sending an Alert command for determining the address of the folder to be synchronized, the client sends to the server a sync command for acquiring the folder structure of the target database. In order to distinguish this sync command for acquiring the folder structure of the target database from the above two sync commands, the sync command can be called a third sync command. The third sync command can be implemented by using a Get element, e.g., the Get command instance shown in the following example. The existing Get command is only used for acquiring device performance information, so that, in order to request acquiring the database folder structure, the definition of the existing Get command should be extended, in which, an identifier for indicating a request for acquiring the database folder structure is added in the definition.

```
<Get>
......
<Target><LocURI>/contacts?List = struct</LocURI></Target>......
</Get>
```

In the Target element shown in the above Get command instance, "/contacts" refers to the URI of the target database, "?List=struct" refers to the identifier for indicating the request for acquiring the database folder structure. And after receiving the Get command, the server finds out the database corresponding to the URI of the target database.

2. The server returns to the client the folder structure of the target database by a response of the Get command, e.g., a Results command. Suppose that the folder structure of the server database is that: under a root folder (i.e., the first-level folder node) of "/contacts", there are four sub-nodes including A, B, C and D, which are called the second-level folder node; and sub-nodes of A1 and A2 are under the second-level folder node A, and the two sub-nodes are called the third-level folder node. Herein, the returned Results command can be organized as the following several modes.

(1) One Item element is used for indicating the URI of one node in the folder structure. After receiving the Results command, the client constructs the folder structure of the server according to the URI indicated by each Item element. The form of the Results command is as follows:

```
<Results> ......
   <Item> ......
      <Source><LocURI>/A</LocURI></Source> ......
   </Item>
   <Item> ......
      <Source><LocURI>/A/A1</LocURI></Source> ......
   </Item>
</Results>
```

(2) All the folder structure data are encapsulated into one element. For example, the folder structure data can be encapsulated in a Data element which is in an Item element, the Item element being a sub-element of a Results element, the folder structure data encapsulated in the Data element may exist as a file or a segment of data represented by XML. In this case, the form of the Results command is as follows:

```
<Results> ......
   <Item> ......
      <Data>folder structure data</Data>
   </Item>
</Results>
```

Other sub-elements or attributes may also be used to indicate the request of acquiring the folder structure in the Get element functioning as the third sync command. The command structures of the Get element and Results element under these cases will not be shown one by one, and no matter which kind of Get element and Results element are used together, they should also be covered in the protection scope of this invention. Similarly, an Add command or a Replace command may also be extended to carry the hierarchy structure data, the extension mode of which is the same as that of the Results command, and should also be covered in the protection scope of this invention.

Alternatively, the client may determine the address of the folder to be synchronized by means of the server imitatively sending to the client the address of the folder to be synchronized. The server sending the address of the folder to be synchronized may be implemented by sending a notification to the client. The format of the notification can be the notification format in the data sync protocol, or the notification can be sent by the server via other engines, e.g., a Short Message Service (SMS), Wireless Application Protocol Push (WAP Push) Service, Session Initiating Protocol Message (SIP Message), Multimedia Message Service (MMS), and etc. The client may pick up the URI of any kind of hierarchy structure to be synchronized.

Upon determining the address of the folder to be synchronized, the client may further send an Alert command carrying the determined source and target address to be synchronized and the negotiation parameter of the sync type, the address of the folder to be synchronized and the negotiation parameter of the sync type can be carried in an Item element, and the form of the Alert command is as follows:

```
<Alert>
   <Sync type>Two-way sync</Sync type>
   <Item>
      <Target><LocURI>/files/folder1(the URI of the folder to be synchronized in the server, named folder1)</LocURI></Target>
      <Source><LocURI>/files/folder1(the URI of the folder to be synchronized in the client, named folder1)</LocURI></Source> ......
   </Item> ......
</Alert>
```

If there are multiple folders to be synchronized, one sync type and multiple Item elements can be carried in one Alert command, and each Item element is used for carrying the address of one folder, wherein, the sync types of the multiple folders to be synchronized are the same.

After receiving the Alert command sent by the client, the server returns to the client a response that carries the negotiation result of the folder to be synchronized so that the client may determine whether to continue by sending the synchronization data to server or re-negotiate. The response may be a sync command for returning a status code in the existing protocol, for example, a Status command.

If there are multiple folders to be synchronized, the mode for returning the response to the client by the server includes: with regard to all the folders to be synchronized, the server returning one response that carries the negotiation results of all the folders; or, the server returning one response for each folder carrying the negotiation result of the one folder, where multiple Status commands can be used respectively for the multiple folders to return the negotiation results of these folders (the negotiation result may be called the status code).

To adopt a different sync type for a different folder, the following schemes can be used.

1. With regard to multiple folders to be synchronized, the client sends to the server an Alert command that carries the addresses of all the folders and the negotiation parameters of the sync types respectively corresponding to each folder. The server determines all the folders to be synchronized according to the addresses of all the folders carried in the Alert command and determines the sync types corresponding to the folders respectively. Herein, the Alert command carries multiple elements (for example, Item elements) originally used for carrying the address of the destination database to be synchronized which are extended to be able to indicate a node-level address and a sync type and is used for bearing the address of one folder (Actually it can indicate any node within the tree structure) to be synchronized and the sync type of the one folder.

2. For each one of the folders to be synchronized, the client sends to the server an Alert command that carries the address of the one folder and the negotiation parameter of the sync type of the one folder. The server determines each folder to be synchronized and the sync type thereof according to the folder address and the negotiation parameter of the sync type of the folder in each Alert command. Herein, the Alert command carries one element originally used for carrying the address of the destination database to be synchronized and one element originally used for carrying the sync type which is extended to be able to indicate a node-level address and is used for bearing the address of the folder (actually it can indicate any node within the tree structure) to be synchronized. The one element originally used for carrying the sync type is used for bearing the negotiation parameter of the sync type.

However, if there are multiple folders to be synchronized and the sync types of the multiple folders are the same, then for all the folders to be synchronized, the client sends to the server one Alert command that carries the addresses of all the folders and the negotiation parameter of the sync type of these folders. The server determines the sync types and all the folders to be synchronized according to the addresses of all the folders and the negotiation parameter in the Alert command. Herein, the Alert command carries multiple elements originally used for carrying the address of the destination database to be synchronized (for example, the Item element) and one element originally used for carrying the sync type (for example, the Data element), where each element originally used for carrying the address of the destination database to be synchronized is extended to one element capable of indicating a node-level address and is used for bearing the address of the folder to be synchronized. The element originally used for carrying the sync type bears one negotiation parameter of the sync type. The Alert element acting as the second sync command may also use other sub-elements or attributes to carry the negotiation parameter of the sync type, the address of the folder to be synchronized, and etc. The command structures in these cases will not be shown one by one, but they should be covered in the protection scope of this invention.

II. Mode 2 is a mode for determining the address of the folder to be synchronized by using a filtering mechanism.

The existing filtering mechanism can only implement the file-level and item-level filtering, which mainly depends on the format of the data to be synchronized. And in one embodiment of the present invention, the existing filtering mechanism is extended to the node level (Here, the node level refers to the folder level), and it is not limited by the format of the data to be synchronized and can be used for all kinds of data formats. by inserting a sub-element for carrying a folder-level filtering condition into the existing Filter element of the SyncML protocol, for example, the element can be named FolderLevel, where the Common Gateway Interface (CGI) syntax can be used to indicate the folder to be synchronized. An attribute or a newly added sub-element of the Filter element may also be used to carry the folder-level filtering condition, and the command structure of this case is not shown hereinafter which should be covered in the protection scope of this invention.

The form of the Filter command is given as follows, carrying two folders to be synchronized respectively numbered 112 and 113.

```
<Filter> ......
    <NodeLevel>
        <Item>
            <Meta><Type>syncml:filtertype-cgi</Type></Meta>
<Data>&LUID &EQ ; 112&AND; &LUID &EQ; 113 (using the CGI
syntax of the Filter element to indicate the numbers of the folders to be
synchronized include 112 and 113) </Data>
        </Item>
    </NodeLevel> ......
</Filter>
```

In the sync phase, the operation type of the sync based on any node is indicated by sending a first sync command which may further indicate the address of the folder to be synchronized, or further carry the data content.

If the address of the folder to be synchronized is carried in the first sync command, the element used for carrying the address of the data to be synchronized in the existing Sync command can be extended, e.g., a Target element, so as to extend the sync granularity from the database level to any node level. For example, the Target element capable of indicating a node-level address (e.g., UID or URI of the folder to be synchronized) can be carried in the Sync command. The existing Sync command can only carry the Target element that just indicates the address of the database to be synchronized. However, the Sync command according to an embodiment of this invention can indicate the address of any node level and carry the data belonging to the range of the indicated addresses but not all the data of the whole database.

In the above solution, one Sync command can carry the address of one folder to be synchronized, if there are multiple folders to be synchronized, the addresses of the multiple folders can be carried in multiple Sync commands respectively or even in one Sync command. For example, the addresses of two folders to be synchronized, correspondingly named folder1 and folder2, are carried in two Sync commands respectively. In the above Sync element acting as the first sync command, other sub-elements or attributes may be used for carrying the address of the folder to be synchronized, and the command structures in these cases will not be shown one by one, but should be covered in the protection scope of this invention.

When the first sync command (for example, a Sync command) carries an operation type, the specific mode for carrying an operation type is the same as that of the prior art, which is to use an element of Add, Replace, Delete, or Move etc., for carrying the operation type. For example, a sub-element can be carried in the Sync Command, the sub-element may be an Add element for indicating an adding operation, or a Replace element for indicating a replacing operation, or a Delete element for indicating a deleting operation, or a Move element for indicating a moving operation, etc. In this way, the recipient side receiving the first sync command can perform the sync operation designated by the operation type for the folder to be synchronized according to the operation type carried in the first sync command. So, it is possible to select an Add element, a Replace element, a Delete element or a Move element and to carry the selected element in the Sync command to indicate various operation types according to the practical situation.

The various information carried in all the above-mentioned first, second and third sync commands of the embodiments of this invention, for example, the data of the node to be synchronized, the node-level address filtering condition, the sync type, the hierarchy structure data, etc, can not only be carried in the sub-element or attribute in the various commands shown above, but also be carried in other sub-elements or attributes. Considering that there are so many implementation cases of these commands, the forms of these commands are not shown one by one here but should be covered in the protection scope of this invention.

The sync phase is hereinafter described with reference to some specific embodiments. For the sync procedure initiated by a client is similar to that initiated by a server, the sync phase is described hereinafter by taking an example that a client initiates the sync procedure and a server performs the data sync operation. In the following embodiments, the first sync command is implemented by using the Sync element of the SyncML protocol, and the Sync element may carry the operation type of Adding, Replacing, Deleting, or Moving etc.

In order to enable the user to create a physical or logical folder and designate any of the folders to be recursively synchronized and non-recursively synchronized, three tables may be configured respectively in the client and the server:

1. A Data Item Table, used for storing information of all the data items, including the correspondence relationship of the UID of the data item and the contents (Data), wherein the UID of the data item is denoted as Item LUID and Item GUID respectively in the client and the server.

2. A Folder Table, used for storing information of all the folders, the information of each folder including the number of the folder, the name of the folder (Name), the parent folder to which the folder belongs (Parent Source), the status of the folder (Folder Status) and the correspondence relationship thereof, wherein, the status of the folder mainly includes: Existing (identified by E), Adding (identified by N), Updating (identified by U), Deleting (identified by D), Moving (identified by M) and Copying (identified by C). The status of Deleting may further include two statuses, Permanent Deletion (identified by P-D, also called Hard Deletion) and Non-permanent Deletion (identified by P-ND, also called Soft Deletion), and the UID of the folder is denoted as Folder LUID and Folder GUID respectively in the client and the server. In the prior art, LUID is different from GUID. However, they could be the same. The evolution of LUID-GUID mechanism would not affect the scope this invention.

3. An Index Table of "data items-folders", used for storing the affiliation of the data items, including, the UID of the data item, the parent item (Parent Source), the status of the data item (Data Status), and the correspondence relationship thereof, wherein, the UID of the data item is denoted as Item LUID and Item GUID respectively in the client and the server.

Moreover, the table of the correspondence relationship between the UID of the data in the client and that in the server should be stored in the server, i.e., the correspondence relationship between GUID and LUID.

In the first of the present invention, a user adds a new folder "bless" under the root folder (e.g., /sms) for short messages, adds two sub-folders of "Spring Festival" and "Mid-autumn Festival" under the folder "bless", and respectively adds data under the folders, e.g., a datum N1 is added under the folder "bless", a datum N2 is added under the folder "Spring Festival", and a datum N3 is added under the folder "Mid-autumn Festival".

Figures 3A, 3B:
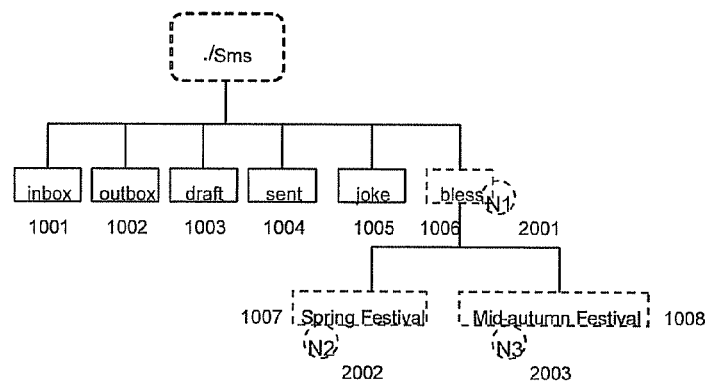
FIG. 3a is a schematic diagram illustrating the data structure defined by a user in accordance with a first embodiment of this invention.
FIG. 3b is a schematic diagram illustrating the data storage of a client in accordance with a first embodiment of this invention.

As shown in FIGS. 3a and 3b, FIG. 3a is a schematic diagram illustrating the data structure defined by the user in the first embodiment of this invention, wherein a square frame indicates a Folder, a circle indicates a data Item, a solid line indicates the status of Existing, and a dashed line indicates the status of New. FIG. 3b is a schematic diagram illustrating the data storage of a client in the first embodiment of this invention. In the client, a Data Item Table, a Folder Table and an Index Table of "data items-folders" are stored. The status of data added in each table is shown correspondingly in FIG. 3b.

When the user requests to sync the folder "bless", the client creates the following sync commands orderly.

First, after determining the data to be synchronized is a folder according to the command for synchronizing the folder "bless" from the user, the client determines according to the Folder Table that the status of the folder "bless" is N. Afterwards, the client constructs a sync command indicating of adding a folder, e.g., an Add sub-element is added in the Sync command to construct an Add sync command which may also be called a sub-command of the Sync command. In the constructed Add command, a Meta field is used for indicating that the data type is folder. The data type is determined according to the Folder Table where a LUID field is used for indicating that the UID of the data to be synchronized is 1006, a Data field is used for indicating that the data content is "bless", and a SourceParent field is used for indicating that the parent folder is the root folder.

Second, the client determines the status of the data item under the folder "bless", and as the status corresponding to the data item 2001 in the Index Table is N, an Add sync command is constructed. After determining based on the Data Item Table that the data content corresponding to the data item 2001 is N1, in the constructed Add sync command, a Meta field is used for indicating that the data type is vCard (known as the kind of Data Item), a LUID field is used for indicating that the UID of the data to be synchronized is 2001, a Data field is used for indicating that the data content is N1, and a SourceParent field is used for indicating that the parent folder is 1006.

If the client has determined that there is no data item newly added under the folder "bless", it then checks the status of the sub-folder(s) under the folder "bless", the implementation of which is the same as that for determining the folder "bless". Two Add sync commands are constructed, in one Add command, there is a Meta field indicating that the data type is Folder, a LUID field indicating that the UID of the data to be synchronized is 1007, a Data field indicating that the data content is "Spring Festival", and a SourceParent field indicating that the parent folder is 1006; and in the other Add command, there is a Meta field indicating that the data type is Folder, a LUID field indicating that the UID of the data to be synchronized is 1008, a Data field indicating that the data content is "Mid-autumn Festival", and a SourceParent field indicating that the parent folder is 1006.

After determining that there is no data item newly added under the folder "bless", the client checks the status of the data items under the folder "Spring Festival" and the folder "Mid-autumn Festival", the implementation of which is the same as that for determining N1, i.e., the client respectively constructs two Add sync commands.

In this way, the recursive sync is implemented by sending the Add sync command for each data item newly added. The non-recursive sync refers to the following cases: 1. only synchronizing one folder but not the data item under the folder, e.g., modification of the folder name; 2. only synchronizing one folder and the data item under it but not synchronizing the subfolder(s).

At last, all the constructed Add sync commands are sent to the server. If the data amount within one Add command is relatively small, multiple Add commands can be included in one message and sent to the server by one-time exchange; and if the data amount of one Add command is relatively large, more than one message is needed to carry multiple Add commands, and all the Add commands can be sent to the server by multiple exchanges. In practice, it is possible to send only one Add sync command including multiple folders and data items, while the one Add sync command should be regarded as multiple logical Add commands.

The process for performing the sync operation after the server receives the above Add command is hereinafter described. The table related to the process is similar to the table shown in FIG. 3b.

After receiving the sync command for adding the folder "bless", the server determines that, the type of the data to be synchronized is Folder according to the Meta field included in the received sync command, the UID of the data to be synchronized in the client is 1006 according to the LUID field, the name of the folder to be synchronized is "bless" according to the Data field, and the parent folder is the root folder according to the SourceParent field. Afterwards, a local UID of the server (Folder GUID) is assigned to the data to be synchronized, such as, 100006. Then, the corresponding item is added in the folder table configured in local, i.e., the item, including 100006, bless, the root folder, the status of the data item and their correspondence relationship, is added. Besides, the UID of the data to be synchronized in the client (i.e., LUID), the UID of the data to be synchronized in the server (i.e., GUID) and the correspondence relationship thereof are stored in the configured table of the correspondence relationship between LUID and GUID, i.e., 1006, 100006 and their correspondence relationship are stored.

If the server has received the sync command for adding the data item N1, it determines that, the type of the data to be synchronized is the data item according to the Meta field in the received sync command, the UID of the data in the client is 2001 according to the LUID field, the data content is N1 according to the Data field, and the parent folder is 1006 according to the SourceParent field. Afterwards, the data item N1 is stored in the local database, and then a local UID of the server (Folder GUID), such as, 200001, is assigned to the data to be synchronized, the corresponding item, such as 200001, N1 and the correspondence relationship thereof, is added in the Data Item Table configured in local; the corresponding item, such as, 200001, 100006, the status of the data item N1 and the correspondence relationship thereof, is added in the Index Table; and the UID of the data to be synchronized in the client, the UID of the data to be synchronized in the server and the correspondence relationship thereof, i.e., 2001, 200001 and the correspondence relationship thereof, are stored in the configured table of the correspondence relationship between LUID and GUID.

The mode for adding the folders "Spring Festival" and "Mid-autumn Festival" in the server is the same as that for adding the folder "bless", and the mode for adding the data items N2 and N3 is the same as that for adding the data item N1.

In addition, it should be noted that, if the server sends sync commands to the client to perform the sync operation, the UID of the data to be synchronized in the server is included in the sync commands, after performing the sync operation, the client returns to the server, the correspondence relationship between the UID of the data in the client and that in the server, i.e., the correspondence relationship between LUID and GUID, and the server stores the received correspondence relationship in the table of the correspondence relationship between LUID and GUID configured in local.

Thus, the sync operation for adding data can be implemented, where, the data may be a specific data item or a folder created by the user as desired which is not limited by the physical data structure of the system. It can be seen that the advantages of an embodiment of the invention is that, for a datum that may belong to multiple nodes in a data structure, only one copy of the datum is transmitted in the data sync of the multiple nodes, and only one copy of the datum is stored by the side performing the sync operation, thereby greatly saving the resources of the network and the device. For example, suppose that N1 belongs to the folders "bless", "Spring Festival" and "Mid-autumn Festival", during the sync operation in the server, two corresponding entries should be added in the Index Table, i.e., item 1 "200001, 100007, the status of the datum N1 and their correspondence relationship" and item 2 "200001, 100008, the status of the datum N1 and their correspondence relationship".

In the second embodiment, the user updates, the attribute of the folder "bless" under the root folder for short messages (/sms), the data item U1 in the folder "bless", and the data item U2 in the folder "Spring Festival". In this embodiment, U2 belongs to the folders "Spring Festival" and "Mid-autumn Festival".

Figures 4A, 4B:
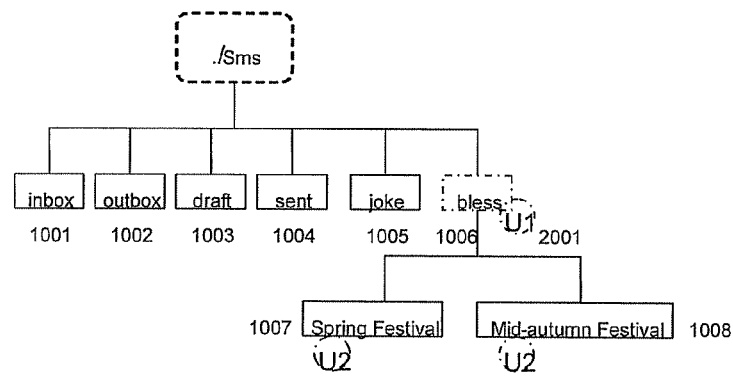
FIG. 4a is a schematic diagram illustrating the data structure defined by a user in accordance with a second embodiment of this invention.
FIG. 4b is a schematic diagram illustrating the data storage of a client in accordance with a second embodiment of this invention.

As shown in FIGS. 4a and 4b, FIG. 4a is a schematic diagram illustrating the data structure defined by the user in the second embodiment of this invention, wherein, a square frame indicates a Folder, a circle indicates a data Item, a solid line indicates that the status is Existing, and a dash-dotted line indicates that the status is Update. FIG. 4b is a schematic diagram illustrating the data storage of a client in the second embodiment of this invention. A Data Item Table, a Folder Table and an Index Table are stored in the client. The status of data in each table is shown correspondingly in FIG. 4b.

If the user requests synchronizing the folder "bless", the client creates the following sync commands orderly.

At first, on determining the data to be synchronized is a folder according to the command received from the user for synchronizing the folder "bless", the client determines the status of the folder "bless" in the Folder Table is U, and constructs a sync command for indicating updating, e.g., a Replace sync command which can be called a sub-command of the Sync command. And in the constructed Replace command, a Meta field is used to indicate that the data type is Folder, which is determined according to the Folder Table, a LUID field is used to indicate that the UID of the data to be synchronized is 1006, a Data field is used to indicate that the specific data is "bless", and a SourceParent field is used to indicate that the parent folder is the root folder.

Afterwards, a client determines the data item status in the folder "bless", as in Index Table, the data item corresponding to the number 1006 is 2001 the status of which is U, a Replace sync command is constructed. After the specific data content corresponding to the data item 2001, determined from the Data Item Table, is N1, in the constructed Replace sync command, a Meta field is used to indicate that the data type is vCard (known as the kind of Data Item), a LUID field is used to indicate that the UID of the data to be synchronized is 2001, a Data field is used to indicate that the specific data is U1, and a SourceParent field is used to indicate that the parent folder to which the data item belongs is 1006.

Then, after determining there is no data items to be replaced, in the folder "bless", the client checks the status of one or more subfolders in the folder "bless", the implementation of which is the same as that for determining the folder "bless", and in this embodiment, the status of the subfolders of the folder "bless" has not been changed, so the subfolders need not to be processed.

At last, when determining there is no subfolders to be synchronized under the folder "bless", the client checks the status of the data item in the subfolder "Spring Festival", the implementation of which is the same as that for determining the data item U1. That is, the client constructs a Replace sync command, and after the specific data content corresponding to the number 2002, determined from the Data Item Table, is U2, in the constructed Replace sync command, a Meta field is used to indicate that the data type is vCard (known as the kind of Data Item), a LUID field is used to indicate that the UID of the data to be synchronized is 2002, a Data field is used to indicate that the specific data is U2, and a SourceParent field is used to indicate that the parent folder to which the data item belongs is 1007.

In this way, the recursive sync can be implemented by sending a Replace sync command for each data to be replaced. Certainly, the non-recursive sync can be implemented as well, the implementation principle of which is similar to that of the recursive sync, and no further description about it is given here. Whether to perform a recursive sync can be determined during negotiating the folder to be synchronized in the sync initialization phase, wherein, a recursive sync identifier is further carried in the second sync command of the embodiments of this invention. A recursive sync identifier with value 'true' indicates that a recursive sync should be performed to the folder to be synchronized, so that, the data sync should be performed to the root node and all the sub-nodes of the folder to be synchronized. If a recursive sync identifier with value 'false' is carried in the second sync command, it indicates a non-recursive sync should be performed to the folder to be synchronized, so that, only to the root node of the folder to be synchronized, the data sync should be performed. If no recursive sync identifier with value 'true' presents, it could be considered as recursive sync always. If it is determined that a recursive sync should be performed to the folder to be synchronized in the sync initialization phase, the data content carried in the first sync command sent by the client or the server in the sync phase includes: the data contents of the root folder and each subfolder of the folder to be synchronized, and the receiving side of the first sync command synchronizes the data contents of the root folder and each subfolder of the folder to be synchronized in turn according to the data contents carried in the first sync command. And if it is determined that a non-recursive sync should be performed to the folder to be synchronized in the sync initialization phase, the data content carried in the first sync command sent by the client or the server in the sync phase includes: the data content of the root folder of the folder to be synchronized, and the recipient side of the first sync command only syncs the data content of the root folder of the folder to be synchronized. Herein, the data content described in the embodiments of this invention indicates the content of the folder and the data item of the folder to be synchronized, for example, the folder name (Name) and the data of the data item (Data).

Afterwards, all the constructed Replace sync commands are sent to the server, the detailed transmitting method is the same as that for transmitting an Add sync command, which will not be described further here.

The process for performing the sync operation after the server receives the above Replace command is hereinafter described. The table related to the process is similar to the table shown in FIG. 4b, which will not be shown here.

After receiving the sync command for replacing the folder "bless", the server determines the type of the data to be synchronized is Folder according to the Meta field of the received sync command, the UID of the data to be synchronized in the client is 1006 according to the LUID field, the name of the data to be synchronized is "bless" according to the Data field, and the parent folder of the data to be synchronized is the root folder according to the SourceParent field. Afterwards, the number of data to be synchronized, which is to be replaced, in the local server, e.g., 100006, is acquired from the configured table of the correspondence relationship between LUID and GUID. Then, the corresponding item is replaced in the local configured folder table, i.e., the attribute information of "bless" in the item is replaced, wherein the item includes: 100006, bless, the root folder, the status of the data item "bless" and the correspondence relationship thereof.

After receiving the sync command for replacing the data item U1, the server determines the type of the data to be synchronized is Data item according to the Meta field of the received sync command, the UID of the data to be synchronized in the client is 2001 according to the LUID field, the specific data content is U1 according to the Data field, and the parent folder is 1006 according to the SourceParent field. Afterwards, the UID of the data to be synchronized, which is herein to be replaced, in the local server (e.g., 200001) is acquired from the configured table of the correspondence relationship between LUID and GUID, and the item corresponding to the local UID of the data to be synchronized is replaced in the data item table configured in local, i.e., the information of U1 in the item of 200001, U1 and their correspondence relationship is replaced.

The method for replacing U2 in the server is the same as that for replacing U1, which will not be described further here.

It should be noted that, in this embodiment, U2 belongs to both the folder "Spring Festival" and the folder "Mid-autumn Festival", but only once does the Replace command need to be sent to replace U2, and U2 only needs to be replaced once in the server, so that the U2 in both of the two folders can be replaced. It is because that, only one copy of the data is stored in the server actually, and the description of the data is indicated in Index Table. It can be seen that, the redundancy data can be decreased farthest by using the method of the embodiments of this invention, so that resources can be saved.

In the third embodiment, the user moves the data item "M1" from the folder "music" to the folder "favorite", and moves the whole folder "mp3" to "favorite".

Figures 5A, 5B:
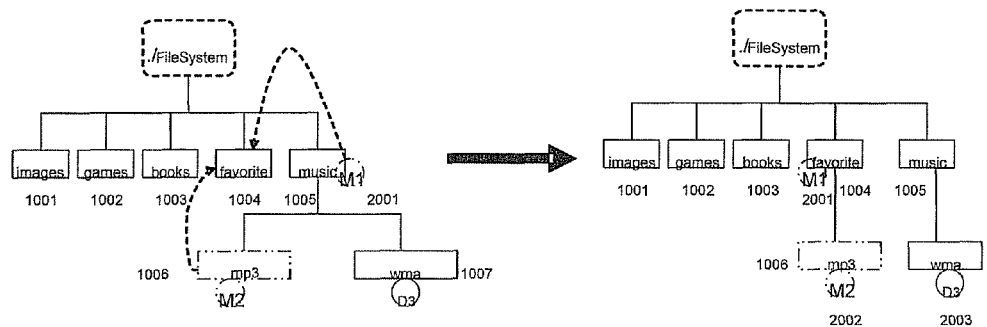
FIG. 5a is a schematic diagram illustrating the data structure defined by a user in accordance with a third embodiment of this invention.
FIG. 5b is a schematic diagram illustrating the data storage of a client in accordance with a third embodiment of this invention.

As shown in FIGS. 5a and 5b, FIG. 5a is a schematic diagram illustrating the data structure defined by the user using the third embodiment of this invention, wherein the square frame indicates a Folder, and the circle indicates a data Item; the solid line indicates that the status is Existing, and the dual-dash-dotted line indicates that the status is Move. FIG. 5b is a schematic diagram illustrating the data storage of a client using the third embodiment of this invention. Data Item Table, Folder Table and Index Table are stored in a client. The data status in each table has the corresponding reflection in FIG. 5b.

When the user request to sync root folder, the client creates the following sync command orderly:

At first, a client checks all subfolder statuses of the root folder according to the command for syncing the root folder received from the user. In this embodiment, all subfolder statuses of the root folder are unchanged, which does not need to be processed. Then, the client checks whether the data item status under the root folder is changed. In this embodiment, the data item status under the root folder is unchanged, which does not need to be processed.

Afterwards, the client checks whether each subfolder status is changed in turn. In this embodiment, the client determines the status of "mp3" subfolder under music folder is M, then, constructs a Move sync command. The Move sync command may also be called a sub-command of the Sync command, which is used to carry the pending move data. In the constructed Move command, a Meta field is used to indicate the data type is a Folder, the data type is determined according to a Folder Table, a LUID field is used to indicate the number of data to be synchronized is 1006, and a SourceParent field is used to indicate the parent folder after the folder is moved is 1004.

Then, the client determines the status of data item under music folder, as the data item corresponding to 1006 is 2001 in Index Table and its status is M, a Move sync command is constructed, and in the constructed command, a Meta field is used to indicate the data type is an Item, a LUID field is used to indicate the number of data to be synchronized is 2001, and a SourceParent field is used to indicate the parent folder after the folder is moved is 1004.

In this way, there is no other moved data in this embodiment, and no further process here.

Afterwards, all the constructed Move sync commands are sent to the server. The detailed transmitting mode is the same as that of transmitting an Add sync command, which will not be described further here.

The process of performing the sync operation after the server receives the above Move command is hereinafter described. The table related in the process is similar to the table shown in FIG. 5b, and the table is not shown here.

After receiving the Move sync command that indicates moving mp3 folder, the server determines the data type to be synchronized is a Folder according to the received Meta field of the Move sync command, and determines the number of data to be synchronized in the client is 1006 according to the LUID field, and determines the parent folder after the mp3 folder is moved is 1004 according to the SourceParent field. Afterwards, the pending move data number in the server (for example: 100006) is acquired from the configured table of correspondence relationship between LUID and GUID, and the parent folder is changed into the parent folder carried in the received Move sync command, i.e. the parent folder corresponding to 100006 in the table is changed from 1005 to 1004, in the item corresponding to the number of local data to be synchronized in local configured Folder Table.

After receiving the Move sync command that indicates moving M1 data item, the server determines the data type to be synchronized is an Item according to the received Meta field of the Move sync command, and determines the number of data to be synchronized in the client is 2001 according to the LUID field, and determines the parent folder after the M1 data item is moved is 1004 according to the SourceParent field, afterwards, the replaced number of data to be synchronized in local server, for example: 200001, is acquired from the configured table of correspondence relationship between LUID and GUID, the parent folder is changed into the parent folder carried in the received sync command, i.e. the parent folder corresponding to 200001 in the table is changed from 1005 to 1004, in the item corresponding to the number of local data to be synchronized in local configured Index Table.

It can be seen that, the method of the embodiments of this invention only needs to modify the correspondence relationship of the corresponding data table and does not need to move the actual data when the move sync operation is performed, so that the limited resources is saved to the maximum extent.

It should be noted that, when a folder as well as its subfolder and the data item are moved, for example, when an mp3 folder is moved, only one Move command needs to be sent in connection with the mp3 folder, and other Move commands in connection with the subfolder and data item under mp3 folder does not need to be sent, because its subfolder and the parent folder to which the data item belongs are unchanged.

When the operation type carried in the first sync command is delete, and the step of syncing the data item under the folder to be synchronized further includes: deciding whether the data content of data item of the folder to be synchronized is only stored under the folder to be synchronized, if so, further carrying a permanent deletion identifier with value 'true' in the first sync command; otherwise further carrying a permanent deletion identifier with value 'false' in the first sync command; the data sync operation performed to the folder to be synchronized by the first sync command includes: deciding whether a permanent deletion identifier with value 'true' is carried in the first sync command, if so, deleting the data content of the data item under the folder to be synchronized; otherwise cancelling the correspondence relationship between the data item and the folder to be synchronized. If no permanent sync identifier with value 'true' presents, it could be considered as permanent deletion always.

In the fourth embodiment, the user deletes the "D1" data item under "bless" folder, and selects a permanent deletion with respect to the data "U2" under "Spring Festival" folder, and selects a non-permanent deletion with respect to the data "D3" under "Spring Festival" folder. In this embodiment, the deletion of the data item is only described.

Figures 6A, 6B:
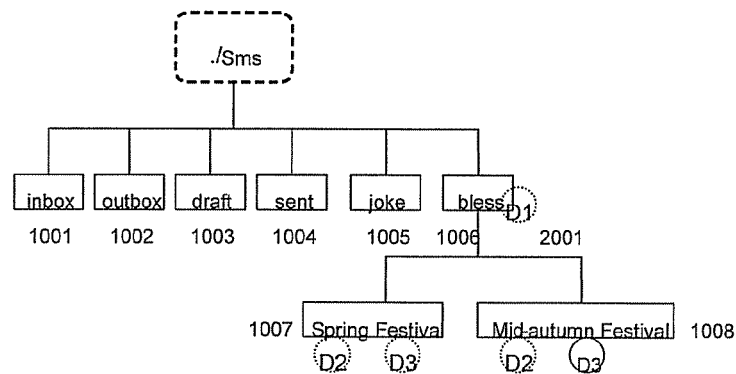
FIG. 6a is a schematic diagram illustrating the data structure defined by a user in accordance with a fourth embodiment of this invention.
FIG. 6b is a schematic diagram illustrating the data storage of a client in accordance with a fourth embodiment of this invention.

As shown in FIGS. 6a and 6b, FIG. 6a is a schematic diagram illustrating the data structure defined by the user using the fourth embodiment of this invention, wherein the square frame indicates a Folder, and the circle indicates a data Item; the solid line indicates that the status is Existing, and the dotted line indicates that the status is Delete. FIG. 6b is a schematic diagram illustrating the data storage of a client using the fourth embodiment of this invention. Data Item Table, Folder Table and Index Table are stored in a client. The data status in each table has the corresponding reflection in FIG. 6b.

When the user requests to sync "bless" folder, the client creates the following sync command orderly:

A client determines the status of the data item under bless folder. As the status of a data item 2001 is P-D, a Delete sync command is constructed. The Delete sync command may also be called a sub-command of the Sync command which is used to carry deleting some data; and in the constructed Delete sync command, a Meta field is used to indicate the data type is an Item, a LUID field is used to indicate the number of data to be synchronized is 2001, and an identifier indicating the permanent deletion also need to be included in the Delete sync command.

After determining there is no deleted data item under bless folder, a client checks the subfolder status under the bless folder. In this embodiment, the subfolder status under the bless folder is unchanged, which does not need to be processed.

After determining there is no deleted subfolder under the bless folder, the client determines the status of data item under the Spring Festival subfolder. The detailed method is the same as that of determining D1. That is, the final result is to construct two Delete sync commands, in one Delete sync command, a Meta field is used to indicate the data type is an vCard (known as the kind of Data Item), a LUID field is used to indicate the number of data to be synchronized is 2002, and an identifier indicating the permanent deletion also needs to be included in the command, for example: P-D. And in the other Delete command, a Meta field is used to indicate the data type is a vCard (known as the kind of Data Item), a LUID field is used to indicate the number of data to be synchronized is 2003, and an identifier indicating the non-permanent deletion also needs to be included in the command, for example: NP-D.

The constructed Delete sync command does not need to include the pending deletion data, and only needs to indicate the type and UID of the pending deletion data in either the permanent deletion or the non-permanent deletion scenarios. The foregoing is an implementing mode of the Delete command, i.e. the command includes three kinds of information of type, UID and identifier used to carry the permanent deletion or the non-permanent deletion; certainly, there are other implementing modes, for example, the Delete command is divided into two commands, one is a P-Delete command, the other is a NP-Delete command, thus, each deletion command only needs to include the type and number of the pending deletion data.

At last, all the constructed sync commands used to carry the deletion are sent to the server.

The process of performing the sync operation after the server receives the above Delete command is hereinafter described.

After receiving the sync command that indicates deleting D1 data item, the server determines the data to be synchronized type is an Item according to the received Meta field of the sync command, and determines the number of data to be synchronized in the client is 2001 according to the LUID field, and determines the deletion is the permanent deletion, afterwards, the pending deletion data number in local server, for example: 200001, is acquired from the configured table of correspondence relationship between LUID and GUID, the item corresponding to the local number of data to be synchronized is respectively deleted, i.e. the whole item numbered 200001 is deleted, in local Data Item Table and Index Table. At the same time, the data D1 is deleted in local database.

After receiving the Delete sync command used to carry deleting D2 data item, the server deletes the whole item of the corresponding data table, the method of deleting D2 is the same as that of deleting D1, which will not be further described here.

After receiving the Delete sync command used to carry deleting D3 data item, the server determines the data to be synchronized type is an Item according to the received Meta field of the Delete sync command, and determines the number of data to be synchronized in the client is 2003 according to the LUID field, and determines the deletion is the non-permanent deletion, afterwards, the pending deletion data number in local server, for example: 200003, is acquired from the configured table of correspondence relationship between LUID and GUID, the item corresponding to the number of local data to be synchronized is only deleted, i.e. the whole item numbered 200003 is deleted and the D3 data is not deleted in local database, in Index Table.

It can be seen that, the method of the embodiments of this invention only needs to send a identifier between a client and a server and does not need to send the detailed data content when the deletion sync operation is performed, so that the limited resources is saved to the maximum extent.

In the fifth embodiment, the user deletes the whole "bless" folder. It equals to delete all subfolders and data items of the "bless" folder. In this embodiment, D1 and D2 only exist under bless folder, D3 exists under bless and joke folder, and this embodiment is only the description of deleting the folder.

Figures 7A, 7B:
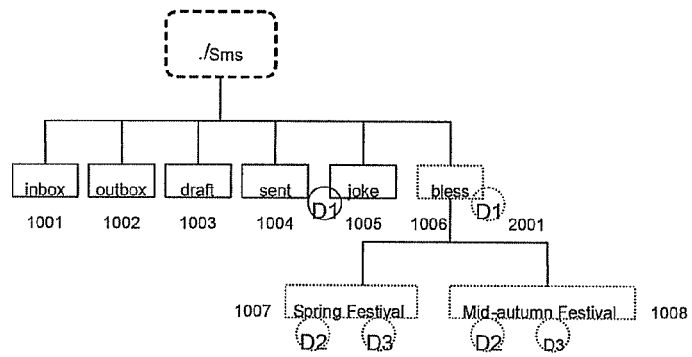
FIG. 7a is a schematic diagram illustrating the data structure defined by a user in accordance with a fifth embodiment of this invention.
FIG. 7b is a schematic diagram illustrating the data storage of a client in accordance with a fifth embodiment of this invention.

As shown in FIGS. 7a and 7b, FIG. 7a is a schematic diagram illustrating the data structure defined by the user using the fifth embodiment of this invention, wherein the square frame indicates a Folder, the circle indicates a data Item; the solid line indicates that the status is Existing, the dotted line indicates that the status is Delete. FIG. 7b is a schematic diagram illustrating the data storage of a client using the fifth embodiment of this invention. Data Item Table, Folder Table and Index Table are stored in a client. The data status in each table has the corresponding reflection in FIG. 7b.

When the user request to sync root folder, the client creates the following sync command orderly:

At first, the client checks all subfolder statuses under the root folder according to the command for syncing the root folder received from the user. In this embodiment, the bless status is determined as D from the Folder Table, the client will further perform the steps of: determining whether the data item of the pending deletion folder and the data item of the subfolder of the folder only exist under the pending deletion folder, if so, constructing a Delete sync command, and including the information that indicates permanent deletion in the Delete sync command; otherwise, respectively constructing a Delete sync command in connection with each data item and folder, and including the information that indicates permanent deletion in the Delete sync command corresponding to the data item or folder that only exists under the pending deletion folder, and including the information that indicates non-permanent deletion in the Delete sync command corresponding to the data item or folder that does not only exists under the pending deletion folder. That is to say, if a data item or folder still exists under other folders (here other folders does not include bless subfolder), and the non-permanent deletion information is included in the Delete sync command corresponding to such data, if it is not such data, and the permanent deletion information is included in the Delete sync command corresponding to it. Afterwards, all constructed Delete sync commands are sent to the server. Herein, a deletion command is respectively constructed in connection with each data item and folder, which actually is the recursive sync.

The process of performing the sync operation after the server receives the above Delete sync command is hereinafter described.

If the command received by the server is the Delete sync command in connection with the data item, the processing mode is the same as that of the fourth embodiment, which will not be described further here.

If the command received by the server is the Delete sync command in connection with the folder, the pending deletion data number in local server is acquired from the configured table of correspondence relationship between LUID and GUID, then no matter the permanent deletion or the non-permanent deletion will delete the item corresponding to the number of local data to be synchronized from the local configured Folder Table.

It also should be noted in connection with the folder deleting operation that, as a sync initiator, when a client deletes a folder, for example deletes the bless folder, it can only construct one Delete sync command in connection with the folder, and other operations performed by it, for example "determining whether the data item of the pending deletion folder and the data item of the subfolder of the folder only exist under the pending deletion folder" and so on, all performed by the server so as to simplify the operation of the client. Certainly, vice versa.

In actual applications, the fourth embodiment is usually used incorporated with the fifth embodiment.

In addition, for the deleting operation, after the server finishes the sync operation, the client will delete the item of its own corresponding data table.

In the sixth embodiment, the user copies the data item "M1" from "music" folder to "favorite" folder; and copies the "mp3" folder to "favorite" folder.

Figures 8A, 8B:
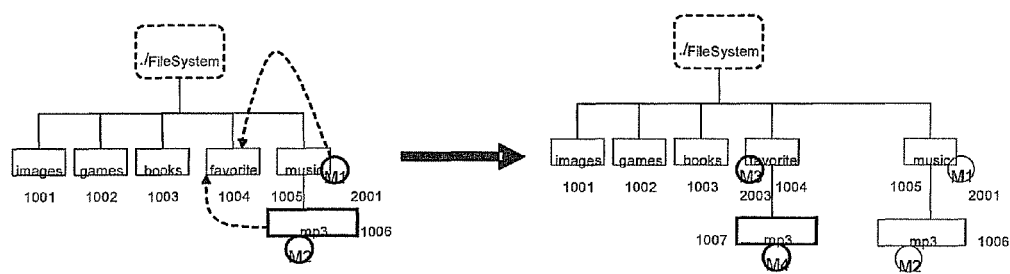
FIG. 8a is a schematic diagram illustrating the data structure defined by a user in accordance with a sixth embodiment of this invention.
FIG. 8b is a schematic diagram illustrating the data storage of a client in accordance with a sixth embodiment of this invention.

As shown in FIGS. 8a and 8b, FIG. 8a is a schematic diagram illustrating the data structure defined by the user using the sixth embodiment of this invention, wherein the square frame indicates a Folder, the circle indicates a data Item; the solid line indicates that the status is Existing, the heavy line indicates that the status is Copy. FIG. 8b is a schematic diagram illustrating the data storage of a client using the sixth embodiment of this invention. Data Item Table, Folder Table and Index Table are stored in a client. The status of data added in each table has the corresponding reflection in FIG. 3b.

It should be noted that, in the above embodiments, a table of correspondence relationship between the number in the client and the number in the server, for example: a table of correspondence relationship between LUID and GUID, the purpose to have LUID-GUID mechanism is to consider that the fact that there are devices with limited capability which may not support a long UID. In the case that all devices can support the long UID, LUID-GUID mechanism evolves like the client and the server using the same UID either generated by the client or the server, then the process can be directly performed by using the same UID, and the LUID-GUID mapping is not necessary any more. Thus in this case, the implementation of the embodiments of this invention is not limited.

When the user needs to sync the root folder, the operation of the client and the server is the same as that of the first embodiment. The difference of them is: in the first embodiment, the client sending one Add sync command in connection with each data item and folder, and in this embodiment, if the client sending a Copy sync command in connection with a folder (the Copy sync command is also a sub-command of the Sync command, which is used to carry pending copy data), it does not need to send Copy sync commands in connection with subfolders and data items under the folder, so that the data transmission amount is further decreased and network resources are saved. The process of the server in this embodiment is the same as that of the first embodiment, and also performs one by one in connection with each folder and data item.

Any more, when the Copy sync is performed, the user determines according to the demand whether a copy of actual data needs to be copied, if so, the data sync operation of the side that performs the sync operation further includes: copying the data in local database, and adding the corresponding item in local configured data folder table.

If the modifying operation of the client is conflicted with that of the server, for example: adding, replacing or deleting some entries in the moved folder, the embodiments of this invention can guarantee the absolute data sync between the client and the server by extending the existing conflict resolution mechanism. The detailed implementation is: extending the existing conflict resolution mechanism to add new resolution named 'Win-Win' for merging the data content from client and server based on some configuration, and assuring the absolute same data between the client and the server by the win-win mode in addition to current 'Client-Win' or 'Server-Win' resolution. When the data operation of the client is conflicted with that of the server, the server detect the conflict and perform 'Win-Win' resolution. Then server send back the sync operation according to the conflict resolution result and the client performs the sync operation according to the data operation of the server, the data operation includes: adding operation, replacing operation, moving operation, deleting operation, copying operation or any combination of them. For example, the user moves A folder and enables it to be a subfolder of B folder in the client, and adds an item in A folder in the server, here, the server will move A folder and enable it to be a subfolder of B folder, and the client also adds an item in A folder so as to guarantee the absolute identical data between the client and the server.

The embodiments of this invention further discloses a system for data sync based on the above method, the system includes: a client and a server, which communicate with each other by exchanging sync commands. The client and the server are further used to determine a folder to be synchronized, and perform the data sync of the folder to be synchronized.

Figure 9:
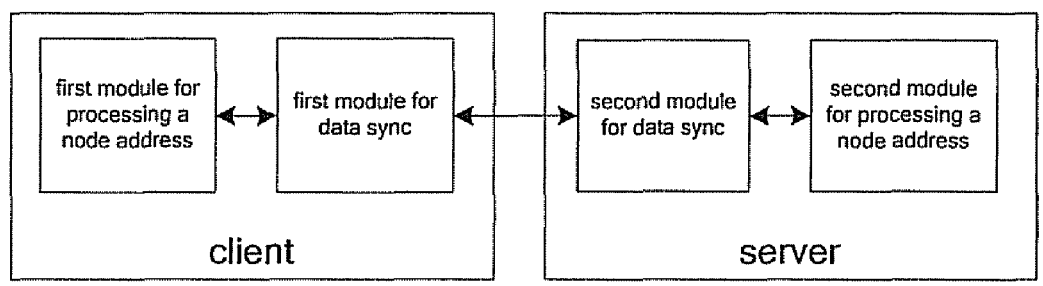
FIG. 9 is a schematic diagram illustrating the system architecture for data sync in accordance with the embodiments of this invention.

FIG. 9 is a schematic diagram illustrating the system architecture for data sync in accordance with the embodiments of this invention. As shown in FIG. 9, the client includes a first module for processing a node address and a first module for data sync, and the server includes a second module for processing the node address and a second module for data sync.

In the client, the first module for processing the node address is used for determining and transmitting the address of a node to be synchronized to the first module for data sync, receiving the address of the node to be synchronized from the first module for data sync, determining the node to be synchronized according to the address received, and providing synchronization between the client and the server for the data under the node to be synchronized; the first module for data sync is used for receiving the address of the node to be synchronized from the first module for processing the node address, constructing a sync command that carries the address of the node to be synchronized, transmitting the sync command to the server, receiving a sync command from the server, acquiring the address of the node to be synchronized from the sync command, and transmitting the acquired address to the first module for processing the node address. The first module for processing the node address may be further used for receiving the address of the node to be synchronized inputted by a configuration command from the user so that the user can set the address of the node to be synchronized for the client.

In the server, the second module for processing the node address is used for determining and transmitting the address of the node to be synchronized to the second module for data sync, receiving the address of the node to be synchronized from the second module for data sync, determining the node currently to be synchronized according to the received address, and providing synchronization between the client and the server for the data under the node to be synchronized; the second module for data sync is used for receiving the address of the node to be synchronized from the second module for processing the node address, constructing a sync command that carries the address of the node to be synchronized, transmitting the sync command to the server, receiving a sync command from the server and acquiring the address of the node to be synchronized from the sync command by analysis, and transmitting the acquired address to the second module for processing the node address.

It can be seen from the above system for data sync that the embodiments of this invention further disclose a client for data sync and a server for data sync. The principle for implementing the client and the server is the same as that of the client and the server in the above system, thus the operating principle and the internal structure thereof are not further described here, but should be covered in the protection scope of this invention.

The foregoing is only preferred embodiments of this invention and is not for use in limiting this invention. Any modification, equivalent replacement or improvement made under the spirit and principles of this invention should be included in the protection scope of this invention.

What is claimed is:

1. A method of synchronizing a plurality of devices, comprising:

during a sync initialization phase in a synchronization session, receiving, by a first device, from a second device a description of a hierarchical tree structure in said second device; and determining, by the first device, an address of an informational node to be synchronized among a plurality of informational nodes arranged in said hierarchical tree structure based on said description, said description being used for describing hierarchical locations of all the informational nodes amongst the hierarchical tree structure, said address comprising a hierarchical location which is used for locating said informational node amongst the hierarchical tree structure, and said informational node being a data item or a folder in a database;

during said sync initialization phase, sending, by the first device, a sync command to the second device for designating the informational node to be synchronized, the sync command comprising the address of the informational node;

utilizing, by the first device, the address during a sync phase in said synchronization session to synchronize the informational node designated; and, the method further comprising:

configuring three tables in both said first device and said second device, said three tables are used by the first device and the second device to synchronize said informational node during the sync phase, said three tables comprising:
  a first table, used for storing information of all the data items in said hierarchical tree structure, said information of each data item comprising a correspondence relationship between a unique identifier (UID) of the data item and contents thereof;
  a second table, used for storing information of all the folders in said hierarchical tree structure, said information of each folder comprising the number of the folder, the name of the folder, the parent folder to which the folder belongs, the status of the folder and the correspondence relationship thereof, in which the status of the folder comprises: Existing, Adding, Updating, Deleting, Moving or Copying; and
  a third table, used for storing affiliation of all the data items in said hierarchical tree structure, said affiliation of each data item comprising the UID of the data item, the parent folder to which the data item belongs, the status of the data item, and correspondence relationship thereof;
and during the sync phase, further comprising:
  when synchronizing a folder in said hierarchical tree structure, sending to the second device a sync command with an operation type indicated by the status of said folder in the second table; and if determined that there is a data item under said folder according to the third table, further determining, by the first device, the content of the data item under said folder according to the first table, and sending to the second device a second sync command with an operation type indicated by the status of the data item under said folder in the third table, said second sync command comprising the content of the data item and indicating said folder as the parent folder of the data item; and
  when synchronizing a data item in said hierarchical tree structure, determining, by the first device, the content of said data item according to the first table, and sending to the second device a sync command with an operation type indicated by the status of said data item in the third table which comprises the content of the data item.

2. A method of synchronizing a plurality of devices, comprising:
  during a sync initialization phase in a synchronization session, designating, by a first device, an address as an address of an informational node to be synchronized among a plurality of informational nodes arranged in a hierarchical tree structure in a second device, and if said address does not exist in said second device, creating, by said second device, a node at said address, said address comprising a hierarchical location which is used for locating said informational node amongst the hierarchical tree structure, and said informational node being a data item or a folder in a database;
  during said sync initialization phase, sending, by the first device, a sync command to the second device for designating the informational node to be synchronized, the sync command comprising the address of the informational node;
  utilizing, by the first device, the address during a sync phase in said synchronization session to synchronize the informational node designated;
  the method further comprising:
  configuring three tables in both said first device and said second device, said three tables are used by the first 3. A method of synchronizing a plurality of devices, comprising:
  during a sync initialization phase in a synchronization session, obtaining, by a first device, an address of an informational node to be synchronized among a plurality of informational nodes arranged in a hierarchical tree structure in a second device, said address comprising a hierarchical location which is used for locating said informational node amongst the hierarchical tree structure, and said informational node being a data item or a folder in a database;
  wherein said address comprises a filter condition;
  during said sync initialization phase, sending, by the first device, a sync command to the second device for designating the informational node to be synchronized, the sync command comprising the address of the informational node;
  utilizing, by the first device, the address during a sync phase in said synchronization session to synchronize the informational node designated;
  the method further comprising:
  configuring three tables in both said first device and said second device, said three tables are used by the first device and the second device to synchronize said informational node during the sync phase, said three tables comprising:
- a first table, used for storing information of all the data items in said hierarchical tree structure, said information of each data item comprising a correspondence relationship between a unique identifier (UID) of the data item and contents thereof;
- a second table, used for storing information of all the folders in said hierarchical tree structure, said information of each folder comprising the number of the folder, the name of the folder, the parent folder to which the folder belongs, the status of the folder and the correspondence relationship thereof, in which the status of the folder comprises: Existing, Adding, Updating, Deleting, Moving or Copying; and
- a third table, used for storing affiliation of all the data items in said hierarchical tree structure, said affiliation of each data item comprising the UID of the data item, the parent folder to which the data item belongs, the status of the data item, and correspondence relationship thereof;

and during the sync phase, further comprising:
- when synchronizing a folder in said hierarchical tree structure, sending to the second device a sync command with an operation type indicated by the status of said folder in the second table; and if determined that there is a data item under said folder according to the third table, further determining, by the first device, the content of the data item under said folder according to the first table, and sending to the second device a second sync command with an operation type indicated by the status of the data item under said folder in the third table, said second sync command comprising the content of the data item and indicating said folder as the parent folder of the data item; and
- when synchronizing a data item in said hierarchical tree structure, determining, by the first device, the content of said data item according to the first table, and sending to the second device a sync command with an operation type indicated by the status of said data item in the third table which comprises the content of the data item.

4. An apparatus for synchronizing comprising a processor and memory, and further comprising:
- a first module, adapted to during a sync initialization phase in a synchronization session, receive from a second device a description of a hierarchical tree structure in said second device; and determine an address of an informational node to be synchronized among a plurality of informational nodes arranged in said hierarchical tree structure based on said description; said description being used for describing hierarchical locations of all the informational nodes amongst the hierarchical tree structure, said address comprising a hierarchical location which is used for locating said informational node amongst the hierarchical tree structure, and said informational node being a data item or a folder in a database;
- a second module, adapted to, during said sync initialization phase, send a sync command to the second device for designating the informational node to be synchronized, and utilize the address obtained from the first module to synchronize the informational node during a sync phase in said synchronization session, the sync command comprising the address of the informational node and the informational node being a data item or a folder in a database;

wherein three tables are configured to synchronize said informational node during the sync phase, said three tables comprising:
- a first table, used for storing information of all the data items in said hierarchical tree structure, said information of each data item comprising a correspondence relationship between a unique identifier (UID) of the data item and contents thereof;
- a second table, used for storing information of all the folders in said hierarchical tree structure, said information of each folder comprising the number of the folder, the name of the folder, the parent folder to which the folder belongs, the status of the folder and the correspondence relationship thereof, in which the status of the folder comprises: Existing, Adding, Updating, Deleting, Moving or Copying; and
- a third table, used for storing affiliation of all the data items in said hierarchical tree structure, said affiliation of each data item comprising the UID of the data item, the parent folder to which the data item belongs, the status of the data item, and correspondence relationship thereof;

and during the sync phase, the second module is further adapted to:
- when synchronizing a folder in said hierarchical tree structure, send to the second device a sync command with an operation type indicated by the status of said folder in the second table; and
- if determined that there is a data item under said folder according to the third table, determine the content of the data item under said folder according to the first table, and send to the second device a second sync command with an operation type indicated by the status of the data item under said folder in the third table, said second sync command comprising the content of the data item and indicating said folder as the parent folder of the data item; and
- when synchronizing a data item in said hierarchical tree structure, determine the content of said data item according to the first table, and send to the second device a sync command with an operation type indicated by the status of said data item in the third table which comprises the content of the data item.

5. The method of claim 1, said sending, by the first device, a sync command to the second device for designating the informational node to be synchronized, comprising:
- sending, by the first device, to the second device an Alert command carrying determined source and target addresses to be synchronized and a negotiation parameter of sync type.

6. The method of claim 1, said receiving, by a first device, from a second device a description of a hierarchical tree structure in said second device, comprising:
- sending, by the first device, to the second device a sync command for acquiring the description of the hierarchical tree structure in said second device; and,
- returning, by the second device, to the first device the description of the hierarchical tree structure in said second device by a response.

7. The method of claim 6, wherein,
said sync command for acquiring said description is an extended sync command which is used for acquiring device performance information, wherein an identifier for indicating a request for acquiring a description of a hierarchical tree structure in a device is added in said extended sync command; and the description of the hierarchical tree structure in said second device is returned to the first device by a second extended command, wherein multiple Item elements are included in said second extended command and each Item element is used for indicating the description of one informational node in the hierarchical tree structure, or one Item element is included in said second extended command and the descriptions of all the informational nodes in the hierarchical tree structure are encapsulated in the one Item element.

8. The method of claim 1, said receiving, by a first device, from a second device a description of a hierarchical tree structure in said second device, comprising:

sending initiatively, by the second device, to the first device said description of the hierarchical tree structure in said second device by a notification, wherein, the notification is in accordance with a modified SyncML protocol, and alternatively, the notification is sent by the second device via any of the following services: Short Message Service (SMS), Wireless Application Protocol Push (WAP Push) Service, Session Initiating Protocol Message (SIP Message) and Multimedia Message Service (MMS).

9. The method of claim 3, wherein, said filter condition is node-level, and said sync command comprises a Filter element comprising a newly added sub-element or an attribute for carrying a node-level filter condition, where a Common Gateway Interface (CGI) syntax is used to indicate the informational node to be synchronized.

10. The method of claim 1, said sync command of said sync initialization phase further comprising a recursive sync identifier for indicating whether a recursive sync is to be performed or not, wherein:

if it is determined during the sync initialization phase that said recursive sync identifier indicates that a recursive sync is to be performed, during the sync phase, the first device utilizes said address of the informational node designated to synchronize all the informational nodes of a sub-tree in the hierarchical tree structure, taking the designated informational node as the root node of said sub-tree; and, if it is determined during the sync initialization phase that said recursive sync identifier indicates that a non-recursive sync is to be performed, during the sync phase, the first device utilizes said address of the informational node designated to synchronize only the designated informational node.

* * * * *